US010257763B2

(12) United States Patent
Zhang et al.

(10) Patent No.: US 10,257,763 B2
(45) Date of Patent: Apr. 9, 2019

(54) ROUTING PROTOCOL FOR ADVANCED METERING INFRASTRUCTURE SYSTEM

(71) Applicants: Agency for Science, Technology and Research, Singapore (SG); Power Automation Pte Ltd, Singapore (SG)

(72) Inventors: Qingjun Zhang, Singapore (SG); Ser Wah Oh, Singapore (SG); Yuen Sam Kwok, Singapore (SG); Sen Gopa, Singapore (SG); Feng Hong, Singapore (SG); Pankaj Sharma, Singapore (SG); Chong Yee Lee, Singapore (SG); Gim Kerk See, Singapore (SG)

(73) Assignees: Agency for Science, Technology and Research, Singapore (SG); Power Automation Pte Ltd, Singapore (SG)

( * ) Notice: Subject to any disclaimer, the term of this patent is extended or adjusted under 35 U.S.C. 154(b) by 0 days.

(21) Appl. No.: 15/327,764

(22) PCT Filed: Jul. 22, 2015

(86) PCT No.: PCT/SG2015/050226
§ 371 (c)(1),
(2) Date: Jan. 20, 2017

(87) PCT Pub. No.: WO2016/013979
PCT Pub. Date: Jan. 28, 2016

(65) Prior Publication Data
US 2017/0208528 A1 Jul. 20, 2017

(30) Foreign Application Priority Data
Jul. 22, 2014 (SG) .......................... 10201404299OU (51) Int. Cl.
*H04W 40/12* (2009.01)
*H04W 16/18* (2009.01)
(Continued)

(52) U.S. Cl.
CPC ......... *H04W 40/02* (2013.01); *H04L 12/6418* (2013.01); *H04W 16/18* (2013.01); *H04W 84/18* (2013.01); *H04W 88/16* (2013.01)

(58) Field of Classification Search
None
See application file for complete search history.

(56) References Cited

U.S. PATENT DOCUMENTS

9,116,013 B2 * 8/2015 Sobotka ................. G01D 4/002
2007/0291649 A1 * 12/2007 Nabae ..................... H04L 45/00
370/237
(Continued)

*Primary Examiner* — Hong S Cho
(74) *Attorney, Agent, or Firm* — K. David Crockett, Esq.; Paul J. Backofen, Esq.; Crockett & Crockett, PC (57) ABSTRACT

There is provided an Advanced Metering Infrastructure (AMI) system including a plurality of gate-ways interconnected by a network comprising a plurality of subnets based on one or more types of networking protocols, each of the plurality of gateways communicatively coupled to or integrated in a metering device; and a concentrator connected to the network for receiving metering data from the metering devices. The concentrator and the plurality of gateways each defines a communication node in the network. In particular, each of the gateways is configured to store a route information comprising at least a primary route information and is operable to route uplink data received based on the route information, the primary route information indicating a predetermined one of the communication nodes for the gateway to route the uplink data to next as a first priority.

17 Claims, 5 Drawing Sheets

(51) Int. Cl.
  *H04L 12/64* (2006.01)
  *H04W 88/16* (2009.01)
  *H04W 84/18* (2009.01)
  *H04W 40/02* (2009.01)

(56) References Cited

U.S. PATENT DOCUMENTS

| | | | | |
|---|---|---|---|---|
| 2008/0095163 | A1* | 4/2008 | Chen | H04L 45/16 370/392 |
| 2008/0310311 | A1* | 12/2008 | Flammer | H04L 45/00 370/238 |
| 2011/0182298 | A1* | 7/2011 | Shimizu | H04L 45/02 370/401 |
| 2013/0145452 | A1* | 6/2013 | Ollukaren | H04L 63/0272 726/15 |
| 2015/0215177 | A1* | 7/2015 | Pietrowicz | H04L 43/106 370/230 |

\* cited by examiner

ROUTING PROTOCOL FOR ADVANCED METERING INFRASTRUCTURE SYSTEM

CROSS-REFERENCE TO RELATED APPLICATION

This application claims the benefit of priority of Singapore Patent Application No. 10201404299U, filed 22 Jul. 2014, the content of which being hereby incorporated by reference in its entirety for all purposes.

TECHNICAL FIELD

The present invention generally relates to a routing protocol/mechanism for an Advanced Metering Infrastructure (AMI) system, and more particularly, to an inter-network routing mechanism/protocol.

BACKGROUND

An Advanced Metering Infrastructure (AMI) system is capable of covering a large geographic area and support meter traffic communications under various different circumstances or requirements. For example, the AMI system may employ different networking techniques/protocols based on different situations. The appropriate networking technique/protocol to be employed may be influenced by various factors such as the location where the meter(s) is installed, the challenges imposed by the surrounding environment for radio propagation, and the distance/area to be covered. Depending on the circumstances, the various networking techniques/protocols may include a TV White Spaces (TVWS), a suitable technology for long range wireless installation, Broadband over Power-Line Communication (BPLC) for in-building networking, and ZigBee for short range connection. These various networks are normally partitioned at different levels and cascaded to build the whole AMI system. In this regard, an AMI system may grow over time to involve a very large number of meters (e.g., many thousands or millions of meters) and many levels of networks.

There exist a variety of inter-network routing protocols, such as the Open Shortest Path First (OSPF) protocol and the Dynamic Source Routing (DSR) protocol.

However, such conventional routing protocols require strong/powerful routers (e.g., with high processing power and/or a large memory), which are not ideal in the AMI environment.

As an example, in the DSR protocol, route is formed on demand when traffic is to be sent to a destination. During this route discovery, the concentrator floods a route request in the network and thereafter, the destination node responds by sending a route reply packet back to the source that carries information on the route traversed by the route request. In this regard, the route request sent by the concentrator is directed to a specific receiver/meter and thus individual route request would need to be broadcast by the concentrator for each receiver/meter which the concentrator wishes to send data to. This results in unnecessary high bandwidth usage as well as requiring powerful gateways/meters for storing the complete routing details, which can be of a significant size for an AMI system handling a large number of meters.

A need therefore exists to provide a simple but yet efficient routing protocol/mechanism for an AMI system that seeks to overcome, or at least ameliorate, one or more of the deficiencies in conventional routing protocols. It is against this background that the present invention has been developed

SUMMARY

According to a first aspect of the present invention, there is provided an advanced metering infrastructure system comprising:
 a plurality of gateways interconnected by a network comprising a plurality of subnets based on one or more types of networking protocols, each of the plurality of gateways communicatively coupled to or integrated in a metering device; and
 a concentrator connected to the network for receiving metering data from the metering devices,
 wherein the concentrator and the plurality of gateways each defines a communication node in the network, and
 each of the gateways is configured to store a route information comprising at least a primary route information and is operable to route uplink data received based on the route information, the primary route information indicating a predetermined one of the communication nodes for the gateway to route the uplink data to next as a first priority.

Preferably, each of the gateways is configured to receive a gateway propagation message from an immediate neighbouring communication node in the network and to determine whether to set the primary route information to indicate the immediate neighbouring communication node as the predetermined communication node based on one or more parameters of the gateway propagation message transmitted from the immediate neighbouring communication node.

Preferably, the parameters of the gateway propagation message transmitted by the immediate neighbouring communication node comprises a parameter for identifying the immediate neighbouring communication node and a parameter indicating a hop count between the immediate neighbouring communication node and the concentrator.

Preferably, the route information further comprises a secondary route information, the secondary route information indicating another predetermined one of the communication nodes for the gateway to route the uplink data to next as a second priority, which is lower than the first priority.

Preferably, the gateway is configured to operate in a primary route status or a secondary route status based on whether a communication link between the gateway and the communication node indicated by the primary route information is operating, the primary route status operable to route the uplink data to the communication node indicated by the primary route information, and the secondary route status operable to route the uplink data to the communication node indicated by the secondary route information.

Preferably, the gateway is configured to initiate a route discovery process for locating one or more immediate neighbouring communication nodes when the communication links between the gateway and the communication nodes indicated by the primary and secondary route information, respectively, are inoperative or when the gateway does not have the primary route information and/or the secondary route information.

Preferably, the gateway is configured to add node information to the uplink data upon receiving the uplink data and before routing the uplink data to the next communication node, said node information comprises information for identifying the gateway which added the node information to the uplink data and information for identifying the subnet from which the gateway received the uplink data.

Preferably, the uplink data originates from one of the metering devices, and the concentrator is configured to:
receive the uplink data including the node information added to the uplink data by each of the gateways which routed the uplink data along an uplink path from said one of the metering devices to the concentrator, and
store the node information added by said each of the gateways as being associated with said one of the metering devices, wherein the stored node information indicates said each of the gateways along a downlink path to be used for routing downlink data from the concentrator to said one of the metering devices.

Preferably, the concentrator is configured to send downlink data to one of the metering devices by adding the stored node information associated with said one of the metering devices to the downlink data, and
wherein each of the gateways along the downlink path indicated by the added node information is configured to remove the node information associated therewith from the downlink data upon receiving the downlink data and before routing the downlink data to the next communication node.

According to a second aspect of the present invention, there is provided a method of configuring an advanced metering infrastructure system comprising a plurality of gateways interconnected by a network including a plurality of subnets based on one or more types of networking protocols, each of the plurality of gateways communicatively coupled to or integrated in a metering device, and a concentrator connected to the network for receiving metering data from the metering devices, wherein the concentrator and the plurality of gateways each defines a communication node in the network, the method comprising:
configuring each of the gateways to store a route information comprising at least a primary route information and to route uplink data received based on the route information, the primary route information indicating a predetermined one of the communication nodes for the gateway to route the uplink data to next as a first priority.

Preferably, the method further comprises configuring each of the gateways to receive a gateway propagation message from an immediate neighbouring communication node in the network and to determine whether to set the primary route information to indicate the immediate neighbouring communication node as the predetermined communication node based on one or more parameters of the gateway propagation message transmitted from the immediate neighbouring communication node.

Preferably, the parameters of the gateway propagation message transmitted by the immediate neighbouring communication node comprises a parameter for identifying the immediate neighbouring communication node and a parameter indicating a hop count between the immediate neighbouring communication node and the concentrator.

Preferably, the route information further comprises a secondary route information, the secondary route information indicating another predetermined one of the communication nodes for the gateway to route the uplink data to next as a second priority, which is lower than the first priority.

Preferably, the method further comprises configuring the gateway to operate in a primary route status or a secondary route status based on whether a communication link between the gateway and the communication node indicated by the primary route information is operating, the primary route status operable to route the uplink data to the communication node indicated by the primary route information, and the secondary route status operable to route the uplink data to the communication node indicated by the secondary route information.

Preferably, the method further comprises configuring the gateway to initiate a route discovery process for locating one or more communication nodes when the communication links between the gateway and the communication nodes indicated by the primary and secondary route information, respectively, are inoperative or when the gateway does not have the primary route information and/or the secondary route information.

Preferably, the method further comprises configuring the gateway to add node information to the uplink data upon receiving the uplink data and before routing the uplink data to the next communication node, said node information comprises information for identifying the gateway which added the node information to the uplink data and information for identifying the subnet from which the gateway received the uplink data.

Preferably, the uplink data originates from one of the metering devices, and the method further comprises configuring the concentrator to:
receive the uplink data including the node information added to the uplink data by each of the gateways which routed the uplink data along an uplink path from said one of the metering devices to the concentrator, and
store the node information added by said each of the gateways as being associated with said one of the metering devices, whereby the stored node information indicates said each of the gateways along a downlink path to be used for routing downlink data from the concentrator to said one of the metering devices.

Preferably, the method further comprises:
configuring the concentrator to send downlink data to one of the metering devices by adding the stored node information associated with said one of the metering devices to the downlink data, and
configuring each of the gateways along the downlink path indicated by the added node information to remove the node information associated therewith from the downlink data upon receiving the downlink data and before routing the downlink data to the next communication node.

According to a third aspect of the present invention, there is provided a metering device for an advanced metering infrastructure system comprising a plurality of gateways interconnected by a network comprising a plurality of subnets based on one or more types of networking protocols, wherein the plurality of gateways each defines a communication node in the network, the metering device comprising:
a processor operable to collect metering data, and
a gateway for the advanced metering infrastructure system for routing uplink data and downlink data received;
wherein the gateway is configured to store a route information comprising at least a primary route information and is operable to route the uplink data received based on the route information, the primary route information indicating a predetermined one of the communication nodes for the gateway to route the uplink data to next as a first priority According to a fourth aspect of the present invention, there is provided a method of routing data in an advanced metering infrastructure system comprising a plurality of gateways interconnected by a network comprising a plurality of subnets based on one or more types of networking protocols, each of the plurality of gateways communicatively coupled to or integrated in a metering device, wherein the plurality of gateways each defines a communication node in the network, the method comprising:

routing, by a gateway of the plurality of gateways, uplink data based on a route information comprising at least a primary route information stored at the gateway, the primary route information indicating a predetermined one of the communication nodes for the gateway to route the uplink data to next as a first priority.

According to a fifth aspect of the present invention, there is provided a computer program product, embodied in a computer-readable storage medium, comprising instructions executable by a computer processor to perform a method of routing data in an advanced metering infrastructure system comprising a plurality of gateways interconnected by a network comprising a plurality of subnets based on one or more types of networking protocols, each of the plurality of gateways communicatively coupled to or integrated in a metering device, wherein the plurality of gateways each defines a communication node in the network, the method comprising:

routing, by a gateway of the plurality of gateways, uplink data based on a route information comprising at least a primary route information stored at the gateway, the primary route information indicating one of the communication nodes for the gateway to route the uplink data to next as a first priority.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Embodiments of the present invention provide a routing protocol/mechanism for an Advanced Metering Infrastructure (AMI) system. The routing protocol is developed to be simple but yet efficient in routing data/messages in an AMI system. In this regard, the present inventors have identified that a metering device in an AMI system should be low cost and power efficient in order to be enable wide deployment, but this would mean restricting the metering device to have limited resources and low computational capability. Therefore, embodiments of the present invention seek to develop a routing protocol/mechanism that can be carried out by such low-powered metering devices but yet is still efficient in routing data/messages in the AMI system.

In embodiments, the routing protocol has a gateway propagation process and a gateway discovery process to advantageously make the AMI system autonomous. These processes will be described later in further details. Furthermore, routing information collection and other resource intensive tasks including route discovery and route information generation may be carried out by the concentrator or the centralized server of the AMI system. This is because centralized servers and concentrators are typically powerful enough to carry out more complex and memory intensive tasks. On the other hand, routing information consumption which requires little computation and memory may be carried out by the gateway or the gateway meter whereby the metering device has integrated therein a gateway. This advantageously moves the complexity of the routing protocol from the gateway metering device to the server/concentrator, thereby reducing the burden on the metering device (thus allowing low-cost/low-powered metering device) and making it possible to achieve a large-scale low-cost AMI system.

In a further embodiment, the routing protocol enables data or messages with different levels of importance to be transmitted/routed with different priorities (e.g., Quality of Service (QoS)). This advantageously enables urgent messages, such as meter top up and meter tampering messages to be transmitted and handled with the highest priority.

In light of the above, embodiments of the present invention provide an AMI system, a method of configuring an AMI system, a metering device for an AMI system, a method of routing data in an AMI system, and a computer program product, embodied in a computer-readable storage medium comprising instructions executable by a computer processor to perform a method of routing data in an AMI system, which will be described hereinafter.

Figure 1:
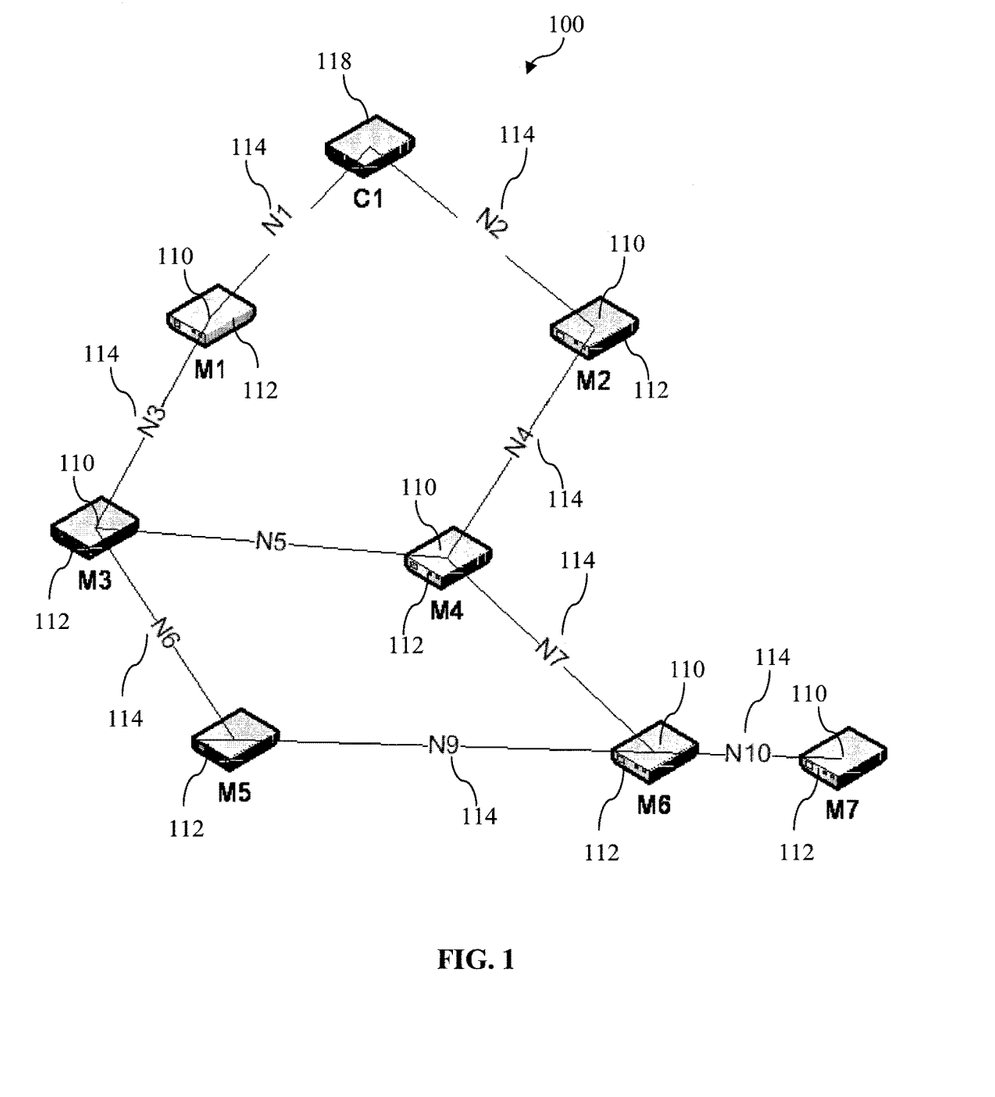
FIG. 1 depicts a schematic drawing of an Advanced Metering Infrastructure (AMI) system according to an embodiment of the present invention.

FIG. 1 depicts a schematic drawing of an AMI system 100 according to an embodiment of the present invention. The AMI system 100 comprises a plurality of gateways 110 interconnected by a network comprising a plurality of subnets 114 based on one or more types of networking protocols. In FIG. 1, for simplicity and ease of understanding, the gateways 110 are each embedded/integrated in the respective metering device 112 (which may be referred to as gateway meters). However, it will be appreciated to a person skilled in the art that the gateway does not need to be integrated in the metering device as long as it is communicatively coupled to the metering devices. For example, the one or more types of networking protocols may be any suitable types of communication technologies such as TV White Spaces (TVWS) for long range connection, Broadband over Power-Line Communication (BPLC) for in-building networking, ZigBee for short range connection, 3G/4G communications, and WiFi.

The AMI system 100 further comprises a concentrator 118 connected to the network for receiving metering data from the metering devices 112. For example, the metering devices 112 may be installed at a customer site for measuring/ collecting various types of energy/resources usage/consumption. The concentrator 118 receives the metering data measured/collected by the metering devices 112 and transmits the metering data to a centralized server for processing such as determining the energy usage by various customers and billing them for the corresponding energy consumptions based on the received metering data. As illustrated in FIG. 1, the concentrator 118 and the plurality of gateways 110 each defines a communication node in the network.

In the embodiment, each of the gateways 110 is configured to store a route information comprising at least a primary route information and is operable to route uplink data based on the route information. The primary route information indicates a predetermined one of the communication nodes for the gateway 110 to route the uplink data to next as a first priority. For example, this advantageously allows an uplink data originating from a metering device 112 to be transmitted/routed to the concentrator 118 without the metering device 112 and the gateway(s) 110 along the uplink path having to store/know or process the complete routing details/information. Instead, each gateway 110 only has to store a primary route information indicating a predetermined one of the communication nodes for the gateway 110 to route the uplink data to next as a first priority, thereby simplifying the processing and storage requirements at the gateway 110 (and thus the gateway maters 112 ) while still being able to route data efficiently. This advantageously shifts the complexity and burden of the routing protocol from the gateway 110/gateway meters 112 to the concentrator 118.

In an embodiment, each of the gateways 110 is configured to receive a gateway propagation message (GPM) from an immediate neighbouring communication node in the network and to determine whether to set the primary route information to indicate the immediate neighbouring communication node as the predetermined communication node based on one or more parameters of the gateway propagation message transmitted from the immediate neighbouring communication node. For example, referring to the example network shown in FIG. 1, with respect to the gateway 110 of the metering device (gateway meter) 112 denoted by M3, the communication nodes at metering devices M1, M4 and M5 are immediate neighbouring communication nodes. Preferably, the parameters of the gateway propagation message transmitted by the immediate neighbouring communication node comprises a parameter for identifying the immediate neighbouring communication node (e.g., node ID or address) and a parameter indicating a hop count between the immediate neighbouring communication node and the concentrator 118.

By way of an example only and without limitation, the gateway 110 may determine to set the primary route information to indicate the immediate neighbouring communication node having the least hop count. In various embodiments, the parameters may further include, but not limited to, one or more of a parameter for identify the concentrator, a parameter indicating a type of the subnet which transmitted the gateway propagation message (e.g., free or chargeable), a parameter indicating a link quality of the subnet which transmitted the gateway propagation message, a parameter indicating the number of metering devices the gateway at the immediate neighbouring communication node is serving, and a parameter indicating the number of metering devices the concentrator is serving.

In a preferred embodiment, the route information stored at the gateway 110 further comprises a secondary route information. The secondary route information indicates another predetermined one of the communication nodes for the gateway to route the uplink data to next as a second priority, which is lower than the first priority. In this regard, the gateway 110 may be configured to operate in a primary route status or a secondary route status based on whether a communication link between the gateway 110 and the communication node indicated by the primary route information is functioning/operating. When the gateway 110 is in the primary route status, the gateway 110 is operable to route the uplink data to the communication node indicated by the primary route information, and when the gateway 110 is in the secondary route status, the gateway 110 is operable to route the uplink data to the communication node indicated by the secondary route information. For example, if the communication link between the gateway 110 and the communication node indicated by the primary route information is functioning/operating (i.e., able to satisfactorily transmit/deliver data), the gateway 110 may operate in the primary route status. On the other hand, if such a communication link is inoperative, the gateway 110 may then resort to operating in the secondary route status as a backup option, such that the routing of the uplink data to the concentrator 118 may continue, albeit via a different path. It will be appreciated to a person skilled in the art that further lower priority route information may be added to the route information to serve as further backup option(s).

In a further embodiment, the gateway 110 is configured to initiate a route discovery process for locating one or more communication nodes (i.e., having a functioning/operating communication link with the gateway 110 for routing the uplink data thereto) when the communication links between the gateway 110 and the communication nodes indicated by the primary and secondary route information, respectively, are inoperative or when the gateway 110 does not have the primary route information and/or the secondary route information.

In a preferred embodiment, the gateway 110 is configured to add node information to the uplink data upon receiving the uplink data and before routing the uplink data to the next communication node. The node information comprises information for identifying the gateway 110 which added the node information to the uplink data and information for identifying the subnet 114 from which the gateway received the uplink data. For example, the node information may be a subheader associated with the gateway 110 that is attached or appended to the uplink data, and may comprise the gateway/communication node ID/address and the ID of the subnet. For example, depending on the addressing scheme, the ID of subnet can be a IPv 4/6 network address for IP based network, or customer defined subnet address for proprietary network. The node information/subheader will be described in further details later in an example with reference to FIG. 6.

In the embodiment of FIG. 1, the uplink data may originate from a particular metering device 112, and the concentrator 118 is configured to receive the uplink data including the node information added to the uplink data by each of the gateways 110 which routed the uplink data along an uplink path from the particular metering device 112 to the concentrator 118. Furthermore, the concentrator 118 is configured to store the node information added by the each of the gateways along the uplink path from the particular metering device 112 to the concentrator 118 as being associated with the particular metering device 112. In this regard, therefore, the stored node information would indicate each of the gateways along a downlink path to be used for routing downlink data from the concentrator 118 to the particular metering device 112. This advantageously enables the concentrator 118 to route downlink data to a desired metering device 112 in the AMI system 100 using the stored node information associated with the desired metering device 112 without having to first broadcast a route request specifically to the desired metering device for obtaining the complete routing details/information, for example, as required in the conventional Dynamic Source Routing (DSR) protocol. The complexity and burden of the routing protocol is thus advantageously moved from the gateways 110/gateway meters 112 to the concentrator 118, therefore reducing the burden on the gateways 110/gateway meters 112.

In the embodiment, the concentrator 118 is configured to send downlink data to a particular metering device 112 by adding the stored node information associated with the particular metering devices 112 to the downlink data. Thereafter, as the downlink data is transmitted along the downlink path, each of the gateways 110 along the downlink path indicated by the added node information is configured to remove the node information associated therewith from the downlink data upon receiving the downlink data and before routing the downlink data to the next communication node. This advantageously reduces the size of the added node information along the downlink path as well as simplifying the routing process since each gateway 110 can simply directly follow the node information to determine which gateway 110 to route to next.

According to an embodiment, there is provided a corresponding method 200 of configuring an AMI system 100 as described hereinbefore. The AMI system 100 comprises a plurality of gateways 110 interconnected by a network including a plurality of subnets 114 based on one or more types of networking protocols, each of the plurality of gateways 110 communicatively coupled to or integrated in a metering device 112. The AMI system 100 further comprises a concentrator 118 connected to the network for receiving metering data from the metering devices 112. In the AMI system 100, the concentrator 118 and the plurality of gateways 110 each defines a communication node in the network.

Figure 2:
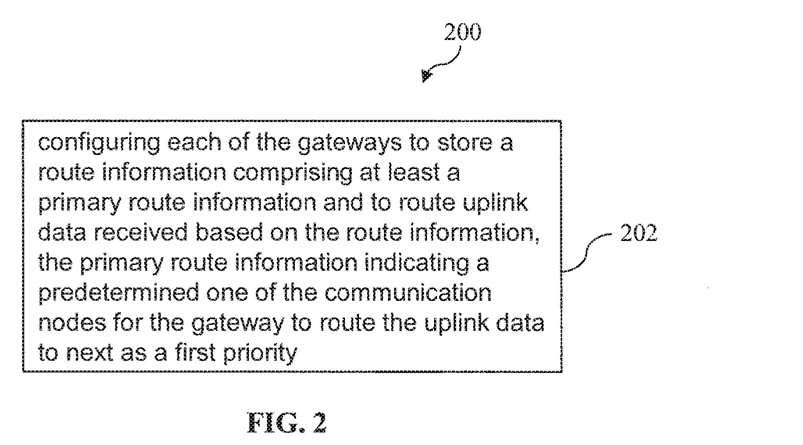
FIG. 2 depicts a block diagram of a method of configuring an AMI system according to an embodiment of the present invention.

In the embodiment, as illustrated in FIG. 2, the method 200 comprises a step 202 of configuring each of the gateways 110 to store a route information comprising at least a primary route information and to route uplink data received based on the route information. The primary route information indicates a predetermined one of the communication nodes for the gateway 110 to route the uplink data to next as a first priority. As explained hereinbefore, this advantageously allows an uplink data originating from a metering device 112 to be transmitted/routed to the concentrator 118 without the gateway(s) 110 along the uplink path having to store/know or process the complete routing details/information from the metering device 112 to the concentrator 118. The complete routing details can require significant memory/storage space in an AMI system having a large number of metering devices. Instead, according to the embodiment, each gateway 110/gateway meters 112 only has to store a primary route information indicating a predetermined one of the communication nodes for the gateway 110 to route the uplink data to next as a first priority, thereby advantageously reducing the computational and memory needs at the gateway 110/gateway meters 112.

As described hereinbefore, preferably, the route information further comprises a secondary route information. The secondary route information indicates another predetermined one of the communication nodes for the gateway 110 to route the uplink data to next as a second priority, which is lower than the first priority. For example, the secondary route information may serves as a backup to the primary route information in the event the communication link between the gateway and the communication node indicated by the primary route information is inoperative. In a further embodiment, to make the AMI system 100 autonomous, the method 200 may further comprise configuring the gateway 110 to initiate a route discovery process for locating one or more communication nodes (i.e., having a functioning/operating communication link with the gateway 110 for routing the uplink data thereto) when the communication links between the gateway 110 and the communication nodes indicated by the primary and secondary route information, respectively, are inoperative or when the gateway 110 does not have the primary route information and/or the secondary route information.

Figure 3:
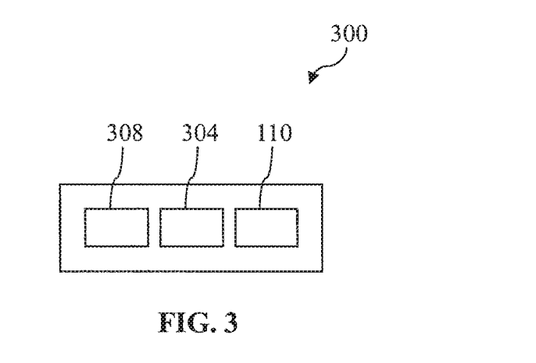
FIG. 3 depicts a schematic drawing of a metering device according to an embodiment of the present invention for an AMI system.

FIG. 3 depicts a schematic drawing of a metering device 300 according to an embodiment of the present invention for an AMI system 100. In the embodiment, the metering device 300 comprises a processor 304 operable to collect metering data and a gateway 110 for the AMI system 100 for routing uplink data and downlink data received. The plurality of gateways 110 each defines a communication node in the network. The metering device 300 may thus be referred to as a gateway metering device (or simply gateway meter). In the same manner as described hereinbefore, the gateway 110 is configured to store a route information comprising at least a primary route information and is operable to route the uplink data received based on the route information. The primary route information indicates a predetermined one of the communication nodes for the gateway 110 to route the uplink data to next as a first priority. The metering device 300 may also comprise a storage medium/memory device 308 for storing various information/data such as metering data collected and instructions executable by the processor 304 for performing various functions as described herein.

Figure 4:
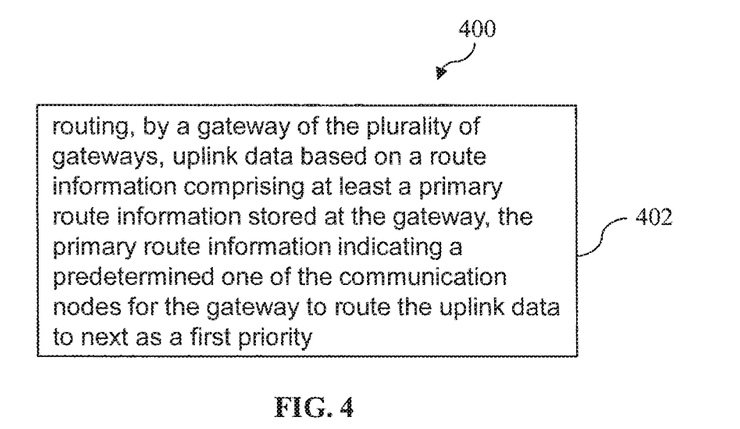
FIG. 4 depicts a block diagram of a method of routing data in an AMI system according to an embodiment of the present invention.

According to an embodiment, there is provided a corresponding method 400 of routing data in an AMI system 100 as depicted in FIG. 4. The method 400 comprises a step 402 of routing, by a gateway of the plurality of gateways 110, uplink data based on a route information comprising at least a primary route information stored at the gateway 110. The primary route information indicates a predetermined one of the communication nodes for the gateway 110 to route the uplink data to next as a first priority. In the embodiment, when routing uplink data, the gateway 110 is operable to add node information to the uplink data upon receiving the uplink data and before routing the uplink data to the next communication node. The node information comprises information for identifying the gateway 110 which added the node information to the uplink data and information for identifying the subnet 114 from which the gateway 110 received the uplink data.

Accordingly, the concentrator 118 may receive the uplink data including the node information added to the uplink data by each of the gateways which routed the uplink data along an uplink path from a particular metering device 112 to the concentrator 118, and store the node information added by each of the gateways 110 as being associated with the metering device 112. Therefore, the stored node information may serve to indicate each of the gateways 110 along a downlink path to be used for routing downlink data from the concentrator 118 to the particular metering device 112. Accordingly, when sending downlink data to a particular metering device 112, the concentrator 118 may add the stored node information associated with the particular metering device 112 to the downlink data, thereby supplying route information for routing the downlink data from the concentrator 118 to the particular metering device 112. Preferably, each of the gateways 110 along the downlink path indicated by the added node information is configured to remove the node information associated therewith from the downlink data upon receiving the downlink data and before routing the downlink data to the next communication node. This advantageously reduces the size of the node information along the downlink path as well as simplifying the routing process since each gateway 110 can simply directly follow the node information to determine which gateway 110 to route to next.

For a better understanding, the routing protocol/mechanism will now be further described according to example embodiments of the present invention. However, it should be understood that the present invention is not limited to the example embodiments described below, which can be modified in various aspects, features, and elements without deviating from the scope of the present invention. Rather, the example embodiments are provided so that this disclosure will be thorough and complete, and will fully convey the scope of the present invention to those skilled in the art.

Figure 5:
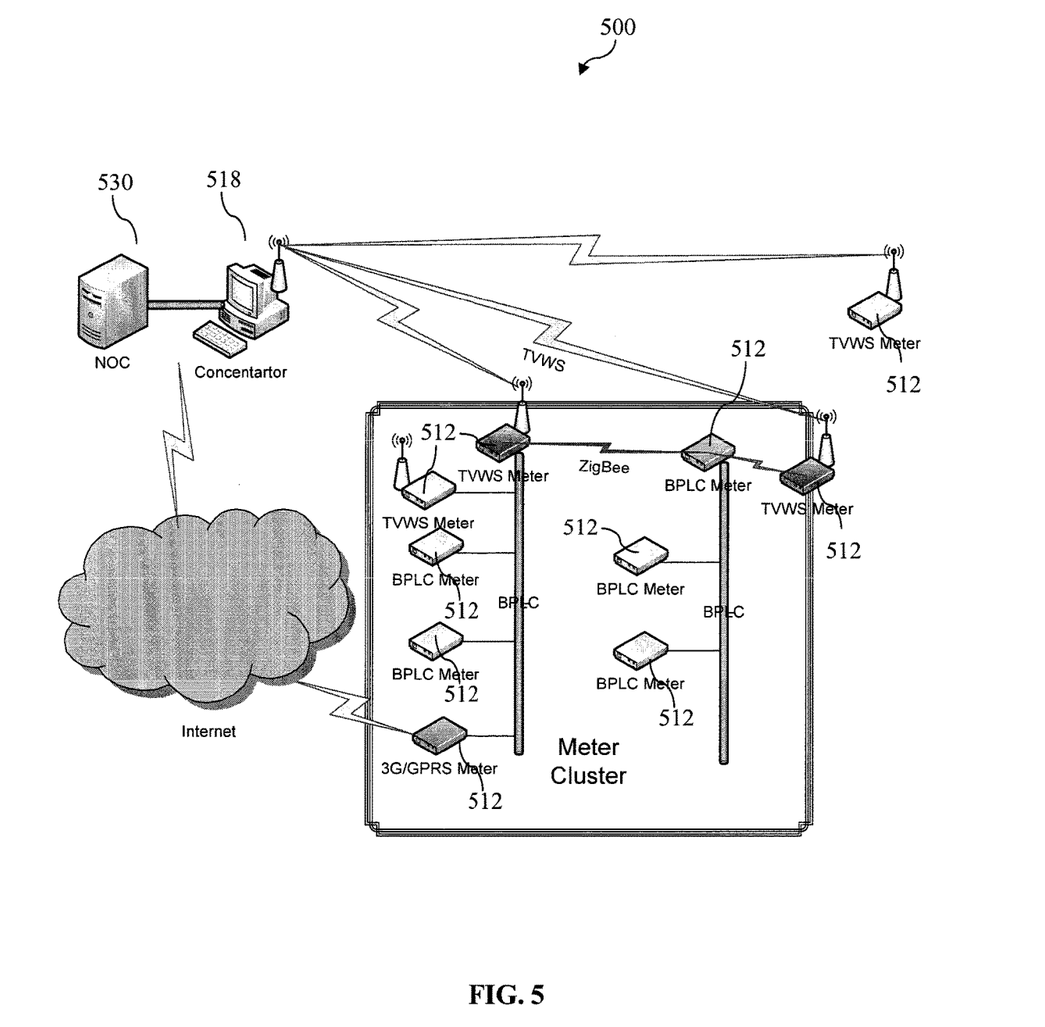
FIG. 5 depicts an exemplary general architecture of an AMI system according to an example embodiment of the present invention.

FIG. 5 schematically depicts an exemplary general architecture of an AMI system 500 according to an example embodiment of the present invention. As shown, the AMI system 500 comprises a plurality of gateway meters 512 interconnected by a network comprising a plurality of subnets based on various types of networking protocols (e.g., TVWS, BPLC, ZigBee, and the Internet). As described hereinbefore, a gateway meter 512 is a meter having a gateway integrated therein. The AMI system 500 further comprises a concentrator 518 connected to the network for receiving metering data from the gateway meter 512, and a centralized server 530 for processing the metering data received from the concentrator 518, such as determining the energy usage by various customers and billing them for the corresponding energy consumptions based on the received metering data.

In the AMI system 500, a gateway is essential for delivery of uplink data/traffic. In the routing protocol according to the example embodiment, two processes are defined, namely, a gateway propagation process and a gateway discovery process.

In relation to the gateway propagation process, when the AMI system 500 is powered up, the concentrator 518 may broadcast gateway propagation messages (GPM) periodically. When a gateway meter 512 receives a GPM, it may compare the GPM with its routing information stored. In the example embodiment, the routing information stored comprises a primary route information (which indicates a predetermined one of the communication nodes (i.e., primary node/gateway) for the gateway meter 512 to route the uplink data to next as a first priority) and a secondary route information (which indicates another predetermined one of the communication nodes (i.e., secondary node/gateway) for the gateway meter 512 to route the uplink data to next as a second priority, which is lower than the first priority). For a gateway meter 512 that has immediate neighbouring gateways and other network interfaces, the gateway meter 512 may be configured to broadcast GPMs on each network interface other than the network interface where primary gateway resides on. When a gateway meter 512 is powered up, it may wait for GPMs first. The gateway meter 512 may initiate a gateway discovery process if no immediate neighbouring gateway was found after timeout. Preferably, any sniffed gateway discovery message (GDM) should cause the gateway meter 512 to delay its own GDM so as to avoid potential collision. Upon receipt of GDM(s) from network interface(s) other that from its primary gateway, a gateway meter 512 may construct and send back gateway a GPM as response. This allows the sending gateway meter 512 that sent the GDM to be aware of the responding gateway meter 512 that send the GPM and thus the responding gateway meter 512 becomes a candidate/potential gateway for the sending gateway meter 512. The GPM may be locally constructed based on sending gateway's node information.

By way of example only, Table 1 below lists the possible parameters/information which a GPM may carry.

TABLE 1

Possible parameters/information which may be included in the GPM

| Name | Possible Values | Description |
| --- | --- | --- |
| concentratorID | Concentrator's ID/Address | Indicates the ID of concentrator |
| gatewayID | Sending Gateway's ID/Address | Indicates the ID of sending gateway |
| t1 Interface | TVWS, Wifi, 3G, Etc. | Indicates the type of first tier subnet, free or chargeable |
| bottleneckInterface | TVWS, BPLC, ZigBee, 3G, Etc. | Indicates the type of bottleneck subnet (for example, bottleneck subnet may refer to the worst subnet along the route to concentrator. It may be used for a node to select its gateways.) |
| bottleneckLinkQual | Excellent, Good, Poor, Lost, etc. | Indicates the link quality of bottleneck subnet |
| bottleThroughput | TVWS, BPLC, ZigBee, 3G, Etc. | Indicates the throughput of bottleneck subnet, i.e., overall throughput of the path |
| netCount | Network Count | Indicates how many networks from the gateway to concentrator |
| hopCount | Hop Count between the meter and its gateway in network | Indicates the hop count from gateway meter to its gateway |
| gatewayLoad | Number of meters the gateway is serving | Indicates how many meters are communicating with server through the gateway |
| concentratorLoad | Number of meters the concentrator is serving | Indicates how many meters are communicating with server through the concentrator |

In an embodiment, the gateway meter 512 may build its own GPMs and broadcast to other subnets other than to the incoming subnet. By way of example only and without limitation, below is an example computer executable code/set of instructions for a GPM building process that may be implemented, with comments inserted for explanatory purpose only. In this example, it is assumed that the gateway information is stored in gwInfo and the GPM to build is gpm.

```
If (multiple network interface modules installed)
{
    while (network Interface Ni != gwInfo.incomingSubnet) //if the
    processing
    subnet Ni is not the same as the gateway's subnet
    {//construct gpm
        gpm.gatewayID = myID
        gpm.networkHops = gwInfo.netHops +1
        gpm.gwInterface = gwInfo.gwInterface
        gpm.bottleneck = min (gwInfo.bottleneck, Ni)
        gpm.hops = hops(gwInfo.incomingSubnet)
        //only send one gpm to a subnet
        if (multiple gpm sent to Ni)
            only send primary gpm
        broadcast gpm to Ni
    }
}
```

The GPM process may be applicable to both primary and secondary GPM building processses. Furthermore, the GPM may specify whether it is for a primary or secondary gateway.

In the example embodiment, a gateway selection process is provided. Based on the GPM received, a gateway meter 512 can decide whether to choose the gateway meter 512 which transmitted the GPM as its primary or secondary gateway. In embodiments, the decision may be made based on criterias such as the strength of communication link (e.g., the stronger the better), the number of hops to the concentrator (e.g., the shorter the better), and the type of subnet which transmitted the GPM (e.g., whether the subnet is free or chargeable). In a further embodiment, there may be a criteria that the link types in the network should be diversified.

By way of example only and without limitation, below is an exemplary computer executable code/set of instructions for a gateway selection process that may be implemented, with comments inserted for explanatory purpose only. In this example, it is assumed that the received gateway propagation message is gpm.

```
Func GwSelection(gpm)
{//prefer free of charge subnets
    if (only one free of charge subnet)
    {
        if (gpm is free)
        {
            replace secondaryGw with gpm
            goto comparePrimarySecondary
        }
        else
        {
            compare two chargable gws and keep the better gpm
            return;
        }
    }
    //prefer different network technique, in case one technique is
    interfered or
    breaks down, another technique has a higher chance to survive
    If (gpm can diversify gwInterface)
    // existing two gateways has the same t1Interface type or
    concentratorID
    {
        replace secondaryGw.
        goto comparePrimarySecondary
    }
```

```
    compareSecondary:
        if (CompareTwoGw(secondaryGw, gpm) == false)
            replace secondaryGw with gpm;
        else
            return;
    comparePrimarySecondary:
        if (CompareTwoGw(primaryGw, secondaryGw) == false)
            replace primaryGw with secondaryGw;
}
Func CompareTwoGw(gw1, gw2)
{
    //if the link is acceptable,
    //can check whether a gw is overloaded if gateway meter can supply
    the information
    // the load checking makes the pseudocode more complex hence is
    not given.
    If (gw1.networkHops < gw2.networkHops - n) //n can select 2,
    which is a hop
    out and back
    {
        if (gw1.bottleneck is acceptable for bandwidth requirement)
        {
            return true; //gw1 is better
        }
        else
            return false; //gw2 is better
    }
    If (gw1.networkHops >= gw2.networkHops + n)
    {
        if (gw1.bottleneck muchBetterThan gw2.bottleneck)
        {
            return true; //gw1 is better
        }
        else
            return false; //gw2 is better
    }
}
```

If a gateway meter 512 did not receive or sniff any packet from any immediate neighbouring gateway, it can send alive test message to the primary gateway and/or secondary gateway. If no reply is received from the primary gateway and/or secondary gateway after try a predetermined number of times, the gateway meter 512 may remove the primary gateway and/or secondary gateway.

Figure 6:
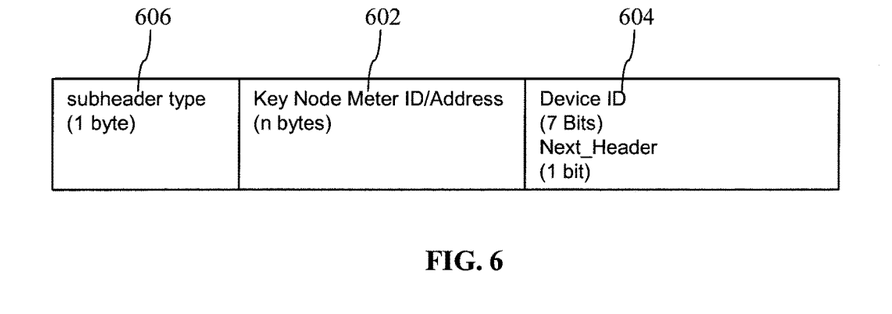
FIG. 6 depicts a schematic representation of an exemplary format of a subheader which a gateway/gateway meter may add to an uplink data according to an example embodiment of the present invention.

In the routing protocol according to the example embodiment, the gateway meter 512 defines a communication node, which may also be referred to as a key node. In the example, key node is the basis for routing and enabling QoS functionalities. Key node information/subheader (i.e., node information) is short piece of information that piggybacks the uplink data/messages. FIG. 6 depicts a schematic representation of an exemplary format of the subheader 600. Preferably, the subheader 600 includes the key node ID/address 602 and the device ID 604 of the network interface where the key node received the message. In this regard, the device refers to network device, associated with a specific networking technique, e.g., TVWS device, PLC device, and so on. Each device of a node has a unique local device ID, so as to be differentiable from other different devices. In an embodiment, different subheader types can be defined for different length of key node IDs. For example, when integrating a legacy system with a new system, the node ID can be different in length. Therefore, to address this issue, a new subheader type may be defined to let the system know the node ID length/type. In various embodiments, parameters, such as the hop count in the corresponding subnet, can also be added.

A routing information collection process will now be described according to the example embodiment. When a primary gateway is found, the gateway meter 512 may send a first message to the server or concentrator 518, which may be an authentication message for example. When a message passes through a key node associated with a gateway meter 512, the key node adds/inserts its key node subheader to the message and relays the message to the next gateway meter 512. Therefore, when the message with the added key node subheaders are received by a concentrator 518, the concentrator 518 will have the key node subheaders of all key nodes traversed along the uplink path, thereby completing the routing information collection process.

In the example embodiment, the server 530 and each concentrator 518 in the AMI system 500 maintain a database (e.g., management information base (MIB)) to store the list of gateway meters 512 that they are serving, including the key node information for each gateway meter 512. In an embodiment, to save bandwidth, the gateway meter 512 is able to control whether the key node should attach key node subheader to a received uplink data by setting a flag in the message. If the network is stable and the gateway meter's key node has not changed, it may dictate no key node subheader to be attached, after authentication has finished (i.e., the concentrator 518 already has the complete routing information between a particular gateway meter and the concentrator 518). For example, when the network is stable, it is possible to skip adding the key node subheader in uplink messages so as to save valuable bandwidth. In this regard, for uplink messages, all primary gateways may be selected to forward the messages, and all the route information have already been made known to concentrator (e.g., from the initial authentication process). When the concentrator wants to send a downlink message, it may use the route information to construct key node subheaders to be attached to the downlink message before transmitting.

Figure 7:
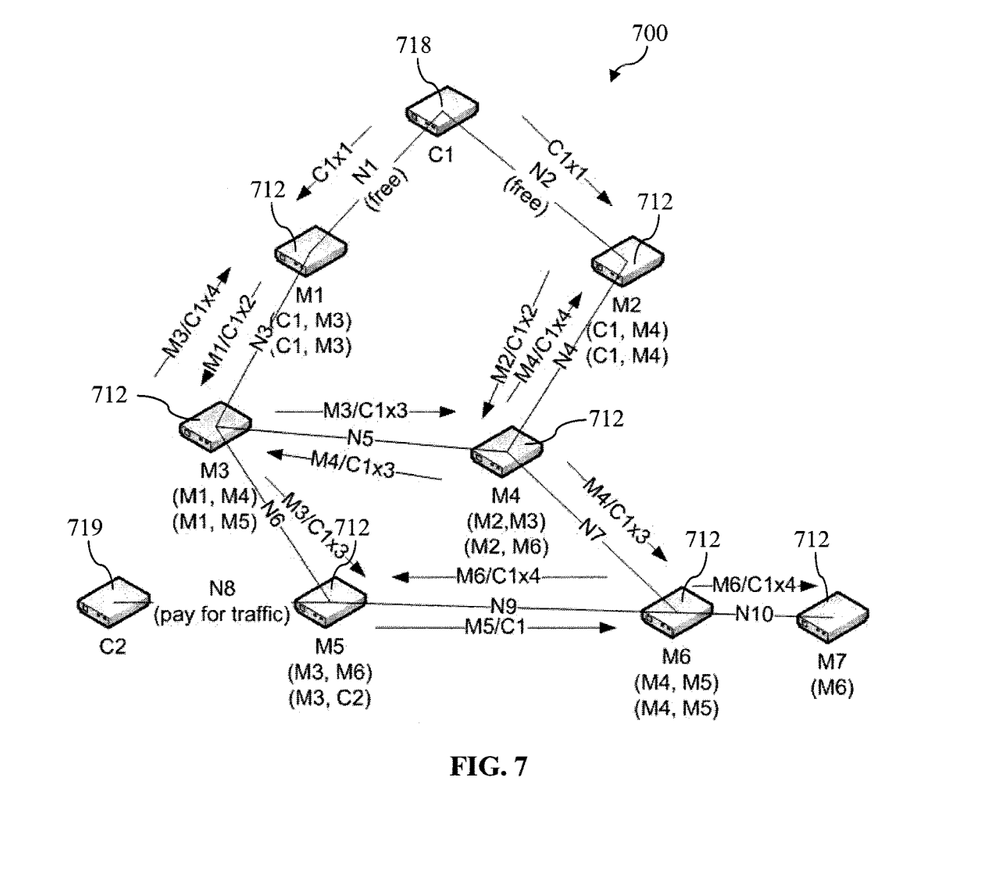
FIG. 7 depicts a schematic drawing of an exemplary AMI system according to an example embodiment of the present invention.

FIG. 7 depicts a schematic drawing of a possible AMI system 700 according to an example embodiment of the present invention. In FIG. 7, C1 and C2 denote the two concentrators 718, 719, $M_n$ denotes the gateway meters 712, and $N_n$ denotes the subnets.

In addition, the ($ID_m$, $ID_n$) under a gateway meter $M_n$ specifies the likely primary and secondary gateway pairs. The first gateway pair under a gateway meter is the likely gateway pair for the case without concentrator C2 719, and the second gateway pair under a gateway meter is the likely gateway pair for the case with concentrator C2. When an uplink message was sent or forwarded, it should be declared whether it is using the primary or secondary route. For example, a flag may be included in the uplink message to indicate whether it is using the primary or secondary gateway.

FIG. 7 illustrates exemplary gateway propagation messages (GPM) that may be sent by the gateway meters 712 in the network and also the likely primary and secondary gateways of each gateway meters. In the example, GPM is shown as meterID/concentratorIDxnetworkHops. As an example, for M3, its primary gateway is M1, so M3 may send primary GPM to N5 and N6, and its secondary gateway is M4 on N5, so M3 may send secondary GPM to N3 and N6. However, in this case, there will be a conflict if both the primary and secondary GPMs are sent to N6. Therefore, M3 will preferably recognise this and only send the primary GPM to N6 and not the secondary GPM to avoid the conflict. Since all GPMs are being transmitted downlink, and network hops are considered, there is no route loop for either the primary route or the secondary route. However, if a communication link is broken/inoperative, a route loop may appear.

In an embodiment, a route loop is detected by checking the key node subheaders. In particular, when a gateway meter 712 receives an uplink message, it may check the key node subheaders added to the message inside for its own ID. If its own ID is found, this means that a link breakdown had occurred and the gateway meter 712 may decide to enter a temporary secondary gateway status which means using the secondary gateway to send the uplink message. Only subheaders from the source gateway meter 712 to the key node is kept and others added after should be removed by the key node since it will be a new route from the meter. Under the temporary secondary gateway status, a key node will send all uplink messages using the secondary route, while trying to probe the primary route or find an alternative route. If the gateway meter 712 is already using the secondary gateway, then the key node may assume that all uplinks known to it are down and a new route discovery process may be initiated. The key node may decide based on its resources and the message's priority whether to buffer the message or discard it. An optional notification message may also be sent back to the source gateway meter 712.

As an example, when gateway meter M7 sends a message, it may be sent to concentrator C1 by going through M6@N10, M4@N7, M2@N4, C1@N2. If a subnet/link N4 breaks down, when the message arrives at gateway meter M4 as M6:N10|M7: Msg, gateway meter M4 is not able to send to its primary gateway M2 and thus sends back to gateway meter M6 using link N7. Therefore, a loopback on N7 has occurred. For example, gateway meter M4 may detect the loopback by searching for its own key node subheader in the incoming uplink message, and if found, it then enters the temporary secondary gateway status and set the uplink message to use the secondary route. In addition, gateway meter M6 may remove gateway meter M4's subheader and send the message using the secondary route. Since the gateway meter M6 is in the temporary secondary gateway status, it sends all following uplink data/traffic through the secondary route. In an embodiment, gateway meter M6 may query gateway meter M4's status and also try to find new gateway. If gateway meter M4 find a new primary gateway M3, gateway meter M4 will then still be the primary gateway of gateway meter M6. On the other hand, if gateway meter M4 is not able to find a primary gateway, gateway meters M4 and M6 may then promote the secondary gateway to primary and leave the temporary secondary gateway status. In this case, the message (M6: N10|M7:Msg) may then be sent to gateway meter M5, and then to concentrator C2 as message (C2|N8|M5:N9|M 6:N10|M7:Msg) as an example.

A routing information consumption process will now be described according to an example embodiment. When the server or concentrator wants to send downlink traffic to a meter, the routing information (key nodes' information) associated with the meter must be in the database (e.g., MIB). In particular, all key nodes' information is retrieved to build key node subheaders for reverse routing. The downlink message may then be sent to the first key node using the corresponding network interface. Upon receiving the downlink message, the first key node removes its own key node subheader and delivers to next key node using the network interface specified in the subheader. This process repeats on each key node along the downlink path until the message reaches the desired meter. Accordingly, by using the key node subheaders, both uplink and downlink relay for a key node is made very simple and the requirements on key nodes are minimized.

Figure 8:
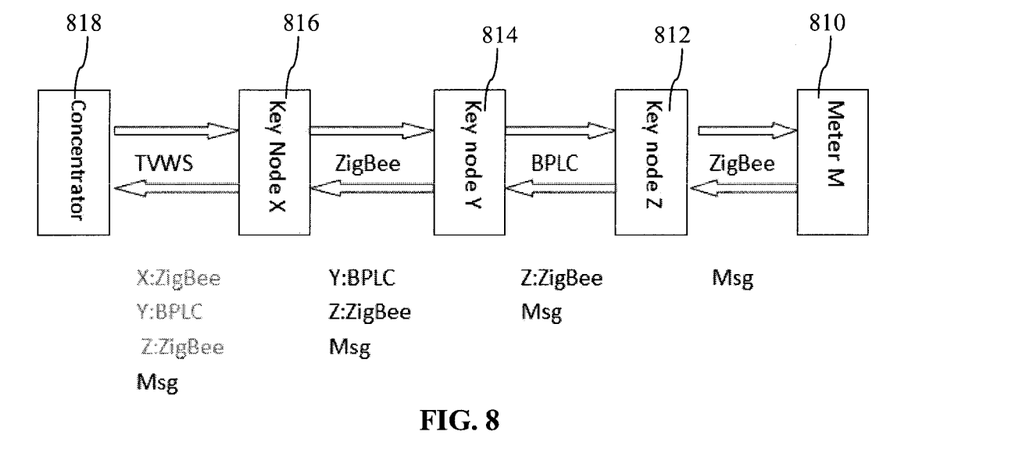
FIG. 8 depicts a schematic block diagram illustrating the routing information collection and consumption processes according to an example embodiment of the present invention.

FIG. 8 is a schematic block diagram illustrating the routing information collection and consumption processes in an example. For routing information collection, first a meter M810 sends a message Msg through its primary gateway Z using network ZigBee. When the message Msg reaches key node Z812, key node Z812 attaches a key node header which carries the node ID Z and interface ID ZigBee and forward to its gateway Y814. Gateway Y814 then attaches a key node header which carries the node ID Y and interface ID BPLC and forwards it to its gateway X816. Gateway X816 attaches a key node header which carries the node ID X and interface ID ZigBee and forwards it to the concentrator 818. The routing information consumption process is a reverse of the routing information collection process. The concentrator 818 sends the message together with all key node subheaders. Each key node will consume its key node subheader as it receives the message and pass the message towards the meter.

For some devices, such as TVWS device, the device may have resources to store the key node information of all nodes it is serving and can be configured to remove the key node headers for minimizing traffic in the case where the key node information is collected by both the device and the concentrator and the network is stable (the key nodes have not changed). If the network is not stable, the removing process will stop and can resume after the network re-stables.

In embodiments, QoS services may be implemented based on the routing protocol to addresses following aspects:

Priority of transmission. For example, there may be 4 types of priority that could be assigned to traffic. Urgent messages such as meter tampering may be sent with highest priority.

Reliability of traffic transmission. For example, different types of acknowledgements may be used to facilitate different levels of reliability of traffic transmission. This QoS service may not solve congestion problem, but provides service so as to ensure that important or urgent traffic are delivered to the end node and not lost along the way.

Based on the key nodes, the following four QoS services may be defined to support AMI traffic better through assigning priority according to embodiments of the present invention.

1. Normal Message Delivery

When a message is sent, delivery of the message is not guaranteed. The transmission of the message totally relies on individual network's transmit mechanism. Example messages are local management messages, such as gateway discovery.

2. Nearest Key Node Recovery/Acknowledge Mechanism

When an important message lost, such as meter reading, the system should try to retrieve it. The nearest key node will try to retrieve reading from a meter and report to gateway meter. Example messages are routine/status reports, e.g., midnight reading for smart meter.

3. Per Key Node Acknowledge

When message delivery requires higher reliability, per key node acknowledgement may be used. Each key node will acknowledge the receipt of a message to it last hop and keep trying to send the message until it receives the acknowledgement from next hop. This is a one direction delivery. After acknowledgement is received, the last sender can stop the resend and rely on next hop to accomplish the transmission.

4. End-to-end acknowledge

For some very important messages, e.g., balance top-up and tariff update messages, the receiver should send acknowledgement messages back to sender and sender will not close the task until it received the acknowledgement.

Now, the routing protocol according to embodiments of the present invention is compared with the conventional Dynamic Source Routing (DSR) protocol. As discussed in the background, in the DSR protocol, route is formed on demand when traffic is to be sent to a destination. During this route discovery, the concentrator floods a route request in the network and thereafter, the destination node responds by sending a route reply packet back to the source that carries information on the route traversed by the route request. In this regard, the route request sent by the concentrator is directed to a specific receiver/meter and thus individual route request would need to be broadcast by the concentrator for each receiver/meter which the concentrator wishes to send data to.

In contrast, the concentrator based on the routing protocol according to embodiments of the present invention sends GPM, but this is not directed to any specific receiver and is sent as broadcast in the network. This advantageously saves the concentrator from sending individual route discovery request for each meter node which the concentrator wishes to send message to. Furthermore, unlike the DSR protocol, the meters based on the routing protocol according to embodiments of the present invention do not send a separate route reply message on receiving route request from the concentrator. Instead, the concentrator receives route details of a meter, when the meter sends any traffic (e.g., authentication message) to the concentrator.

As explained hereinbefore, since the meters are resource constrained with small memory to buffer routing details, to address this issue, the routing protocol/mechanism according to embodiments of the present invention is developed so that the meters do not need to save the complete routing details. Instead, the received GPM is used by each meter to form primary and secondary gateway/keynode information and is saved locally. Therefore in the routing protocol, for uplink traffic, meters do not save the complete source routing details, but rather saves only primary and secondary keynode information and uses these keynode information to send uplink traffic to concentrator.

In general, there are many inter-network routing protocols available, such as OSPF. But these conventional protocols require strong routers and are thus not ideal in AMI environment. Compared with conventional routing protocols, the routing protocol according to embodiments of the present invention may have the following advantages.

Flexibility

The routing protocol according to an embodiment is made flexible so that it can be based on any addressing scheme, whether it is IP based or meter ID based.

Scalability

The maximal networks that can be cascaded is decided by the packet length. Given the short subheader length, it makes it easy to support tens of cascaded networks. Therefore, the routing protocol according to embodiments of the present invention can be deployed in most AMI system.

Low Requirement on Meters

A criteria for developing a routing protocol according to an embodiment of the present invention is to minimize the burden of meters. In this regard, the requirements on meters may preferably be: small memory to buffer the messages, capability to relay messages between different network interfaces, and add and remove key node subheaders. These requirements are light weighted and can be easily fulfilled by all embedded systems in use.

Centralized Database

The server and concentrators have centralized database, which allow administrator to have detailed view of the AMI system, e.g. locating/detecting malfunctioning meters, detecting intrusion, and so on.

Simple to Implement on Meter

Simplicity means small code size and bug-free, which is important for embedded system. The routing protocol according to embodiments of the present invention is specifically designed for the need of AMI system. By moving the complexity of routing mechanism from meters to server/concentrators, almost any meter can act as a gateway. This feature makes possible a large-scale low-cost AMI system and gives administrator maximum freedom when plan the system.

The routing protocol according to embodiments of the present invention focuses on inter-network routing and leaves the routing among homogeneous networks to the networking techniques themselves. The routing protocol only requires that the networking technique support unicast and broadcast traffic. This feature makes the AMI system integrate easily with many different networks, existing networks and future networks.

According to an embodiment of the present invention, there is provided a computer program product, embodied in a computer-readable storage medium, comprising instructions executable by a computer processor to perform a method of routing data in an advanced metering infrastructure system comprising a plurality of gateways interconnected by a network comprising a plurality of subnets based on one or more types of networking protocols, each of the plurality of gateways communicatively coupled to or integrated in a metering device, and a concentrator connected to the network for receiving metering data from the metering devices, wherein the concentrator and the plurality of gateways each defines a communication node in the network. The method comprising: routing, by a gateway of the plurality of gateways, uplink data based on a route information comprising at least a primary route information stored at the gateway, the primary route information indicating one of the communication nodes for the gateway to route the uplink data to next as a first priority.

Some portions of the description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present specification also implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. An advanced metering infrastructure system comprising:
   a plurality of gateways interconnected by a network comprising a plurality of subnets based on one or more types of networking protocols, each of the plurality of gateways communicatively coupled to or integrated in a metering device; and
   a concentrator connected to the network for receiving metering data from the metering devices, wherein the concentrator and the plurality of gateways each defines a communication node in the network, and wherein each of the gateways is configured to store a route information comprising at least a primary route information and is operable to route uplink data received based on the route information, the primary route information indicating a predetermined one of the communication nodes for the gateway to route the uplink data to next as a first priority, receive a gateway propagation message from an immediate neighbouring communication node in the network and to determine whether to set the primary route information to indicate the immediate neighbouring communication node as the predetermined communication node based on one or more parameters of the gateway propagation message transmitted from the immediate neighbouring communication node, and add node information to the uplink data upon receiving the uplink data and before routing the uplink data to the next communication node, said node information comprises information for identifying the gateway which added the node information to the uplink data and information for identifying the subnet from which the gateway received the uplink data.

2. The advanced metering infrastructure system according to claim 1, wherein the parameters of the gateway propagation message transmitted by the immediate neighbouring communication node comprises a parameter for identifying the immediate neighbouring communication node and a parameter indicating a hop count between the immediate neighbouring communication node and the concentrator.

3. The advanced metering infrastructure system according to claim 1, wherein the route information further comprises a secondary route information, the secondary route information indicating another predetermined one of the communication nodes for the gateway to route the uplink data to next as a second priority, which is lower than the first priority.

4. The advanced metering infrastructure system according to claim 3, wherein the gateway is configured to operate in a primary route status or a secondary route status based on whether a communication link between the gateway and the communication node indicated by the primary route information is operating, the primary route status operable to route the uplink data to the communication node indicated by the primary route information, and the secondary route status operable to route the uplink data to the communication node indicated by the secondary route information.

5. The advanced metering infrastructure system according to claim 4, wherein the gateway is configured to initiate a route discovery process for locating one or more immediate neighbouring communication nodes when the communication links between the gateway and the communication nodes indicated by the primary and secondary route information, respectively, are inoperative or when the gateway does not have the primary route information and/or the secondary route information.

6. The advanced metering infrastructure system according to claim 1, wherein the uplink data originates from one of the metering devices, and the concentrator is configured to:
receive the uplink data including the node information added to the uplink data by each of the gateways which routed the uplink data along an uplink path from said one of the metering devices to the concentrator, and
store the node information added by said each of the gateways as being associated with said one of the metering devices, wherein the stored node information indicates said each of the gateways along a downlink path to be used for routing downlink data from the concentrator to said one of the metering devices.

7. The advanced metering infrastructure system according to claim 6, wherein the concentrator is configured to send downlink data to one of the metering devices by adding the stored node information associated with said one of the metering devices to the downlink data, and
wherein each of the gateways along the downlink path indicated by the added node information is configured to remove the node information associated therewith from the downlink data upon receiving the downlink data and before routing the downlink data to the next communication node.

8. A method of configuring an advanced metering infrastructure system comprising a plurality of gateways interconnected by a network including a plurality of subnets based on one or more types of networking protocols, each of the plurality of gateways communicatively coupled to or integrated in a metering device, and a concentrator connected to the network for receiving metering data from the metering devices, wherein the concentrator and the plurality of gateways each defines a communication node in the network, the method comprising:
configuring each of the gateways to store a route information comprising at least a primary route information and to route uplink data received based on the route information, the primary route information indicating a predetermined one of the communication nodes for the gateway to route the uplink data to next as a first priority,
configuring each of the gateways to receive a gateway propagation message from an immediate neighbouring communication node in the network and to determine whether to set the primary route information to indicate the immediate neighbouring communication node as the predetermined communication node based on one or more parameters of the gateway propagation message transmitted from the immediate neighbouring communication node, and
configuring each of the gateways to add node information to the uplink data upon receiving the uplink data and before routing the uplink data to the next communication node, said node information comprises information for identifying the gateway which added the node information to the uplink data and information for identifying the subnet from which the gateway received the uplink data.

9. The method according to claim 8, wherein the parameters of the gateway propagation message transmitted by the immediate neighbouring communication node comprises a parameter for identifying the immediate neighbouring communication node and a parameter indicating a hop count between the immediate neighbouring communication node and the concentrator.

10. The method according to claim 8, wherein the route information further comprises a secondary route information, the secondary route information indicating another predetermined one of the communication nodes for the gateway to route the uplink data to next as a second priority, which is lower than the first priority.

11. The method according to claim 10, further comprises configuring the gateway to operate in a primary route status or a secondary route status based on whether a communication link between the gateway and the communication node indicated by the primary route information is operating, the primary route status operable to route the uplink data to the communication node indicated by the primary route information, and the secondary route status operable to route the uplink data to the communication node indicated by the secondary route information.

12. The method according to claim 11, further comprises configuring the gateway to initiate a route discovery process for locating one or more communication nodes when the communication links between the gateway and the communication nodes indicated by the primary and secondary route information, respectively, are inoperative or when the gateway does not have the primary route information and/or the secondary route information.

13. The method according to claim 8, wherein the uplink data originates from one of the metering devices, and the method further comprises configuring the concentrator to:
  receive the uplink data including the node information added to the uplink data by each of the gateways which routed the uplink data along an uplink path from said one of the metering devices to the concentrator, and
  store the node information added by said each of the gateways as being associated with said one of the metering devices, whereby the stored node information indicates said each of the gateways along a downlink path to be used for routing downlink data from the concentrator to said one of the metering devices.

14. The method according to claim 13, further comprises:
  configuring the concentrator to send downlink data to one of the metering devices by adding the stored node information associated with said one of the metering devices to the downlink data, and
  configuring each of the gateways along the downlink path indicated by the added node information to remove the node information associated therewith from the downlink data upon receiving the downlink data and before routing the downlink data to the next communication node.

15. A metering device for an advanced metering infrastructure system comprising a plurality of gateways interconnected by a network comprising a plurality of subnets based on one or more types of networking protocols, wherein the plurality of gateways each defines a communication node in the network, the metering device comprising:
  a processor operable to collect metering data, and
  a gateway for the advanced metering infrastructure system for routing uplink data and downlink data received;
  wherein the gateway is configured to:
  store a route information comprising at least a primary route information and is operable to route the uplink data received based on the route information, the primary route information indicating a predetermined one of the communication nodes for the gateway to route the uplink data to next as a first priority,
  receive a gateway propagation message from an immediate neighbouring communication node in the network and to determine whether to set the primary route information to indicate the immediate neighbouring communication node as the predetermined communication node based on one or more parameters of the gateway propagation message transmitted from the immediate neighbouring communication node, and
  add node information to the uplink data upon receiving the uplink data and before routing the uplink data to the next communication node, said node information comprises information for identifying the gateway which added the node information to the uplink data and information for identifying the subnet from which the gateway received the uplink data.

16. A method of routing data in an advanced metering infrastructure system comprising a plurality of gateways interconnected by a network comprising a plurality of subnets based on one or more types of networking protocols, each of the plurality of gateways communicatively coupled to or integrated in a metering device, wherein the plurality of gateways each defines a communication node in the network, the method comprising:
  routing, by a gateway of the plurality of gateways, uplink data based on a route information comprising at least a primary route information stored at the gateway, the primary route information indicating a predetermined one of the communication nodes for the gateway to route the uplink data to next as a first priority,
  receiving, by the gateway, a gateway propagation message from an immediate neighbouring communication node in the network and determining, by the gateway, whether to set the primary route information to indicate the immediate neighbouring communication node as the predetermined communication node based on one or more parameters of the gateway propagation message transmitted from the immediate neighbouring communication node, and
  adding, by the gateway, node information to the uplink data upon receiving the uplink data and before routing the uplink data to the next communication node, said node information comprises information for identifying the gateway which added the node information to the uplink data and information for identifying the subnet from which the gateway received the uplink data.

17. A computer program product, embodied in a computer-readable storage medium, comprising instructions executable by a computer processor to perform a method of routing data in an advanced metering infrastructure system comprising a plurality of gateways interconnected by a network comprising a plurality of subnets based on one or more types of networking protocols, each of the plurality of gateways communicatively coupled to or integrated in a metering device, wherein the plurality of gateways each defines a communication node in the network, the method comprising:
  routing, by a gateway of the plurality of gateways, uplink data based on a route information comprising at least a primary route information stored at the gateway, the primary route information indicating one of the communication nodes for the gateway to route the uplink data to next as a first priority,
  receiving, by the gateway, a gateway propagation message from an immediate neighbouring communication node in the network and determining, by the gateway, whether to set the primary route information to indicate the immediate neighbouring communication node as the predetermined communication node based on one or more parameters of the gateway propagation message transmitted from the immediate neighbouring communication node, and
  adding, by the gateway, node information to the uplink data upon receiving the uplink data and before routing the uplink data to the next communication node, said node information comprises information for identifying the gateway which added the node information to the uplink data and information for identifying the subnet from which the gateway received the uplink data.

* * * * *